US010706126B2

(12) United States Patent
Baltieri et al.

(10) Patent No.: US 10,706,126 B2
(45) Date of Patent: Jul. 7, 2020

(54) AUGMENTED REALITY IMPLEMENTATION METHOD

(71) Applicant: PIKKART S.R.L., Modena (IT)

(72) Inventors: Davide Baltieri, Modena (IT); Lorenzo Canali, Modena (IT); Giovanni Zuffolini, Modeno (IT)

(73) Assignee: PIKKART S.R.L., Modena (MO) (IT)

( * ) Notice: Subject to any disclaimer, the term of this patent is extended or adjusted under 35 U.S.C. 154(b) by 0 days.

(21) Appl. No.: 16/325,826

(22) PCT Filed: Sep. 22, 2017

(86) PCT No.: PCT/IB2017/055751
§ 371 (c)(1),
(2) Date: Feb. 15, 2019

(87) PCT Pub. No.: WO2018/055560
PCT Pub. Date: Mar. 29, 2018

(65) Prior Publication Data
US 2019/0213235 A1 Jul. 11, 2019

(30) Foreign Application Priority Data

Sep. 23, 2016 (IT) .............................. UA2016A6790

(51) Int. Cl.
| G06F 17/16 | (2006.01) |
| G06T 19/00 | (2011.01) |
| G06T 1/00 | (2006.01) |
| G06T 11/00 | (2006.01) |

(Continued)

(52) U.S. Cl.
CPC .............. *G06F 17/16* (2013.01); *G06F 17/18* (2013.01); *G06K 7/1417* (2013.01); *G06T 1/0021* (2013.01); *G06T 11/00* (2013.01); *G06T 19/006* (2013.01); *G06T 2201/0052* (2013.01)

(58) Field of Classification Search
CPC ............................. G06F 17/16; G06T 19/006
See application file for complete search history.

(56) References Cited

U.S. PATENT DOCUMENTS

| 6,757,405 B1 | 6/2004 | Muratani et al. |
| 2004/0001608 A1* | 1/2004 | Rhoads .............. H04N 1/32251 382/100 |

(Continued)

FOREIGN PATENT DOCUMENTS

WO  WO2014005736 A1  1/2014

OTHER PUBLICATIONS

Anonymous; "LifePrint Prints Augmented Reality Photos That Come to Life in Your Hands", Nov. 17, 2015; XP055373201.

*Primary Examiner* — Yi Yang
(74) *Attorney, Agent, or Firm* — King & Schlicki, PLLC

(57) ABSTRACT

Described herein is a method for implementing augmented reality associated to carrier means comprising a medium of a physical or digital type, wherein the method comprises in sequence the steps of incorporating an information content within an optical image of the medium, transferring the optical image that incorporates the information content onto the carrier means, decoding the information content, and reproducing the information content on an electronic device, wherein said step of reproducing enables the user to display the augmented reality.

12 Claims, 5 Drawing Sheets

Figure 1A:
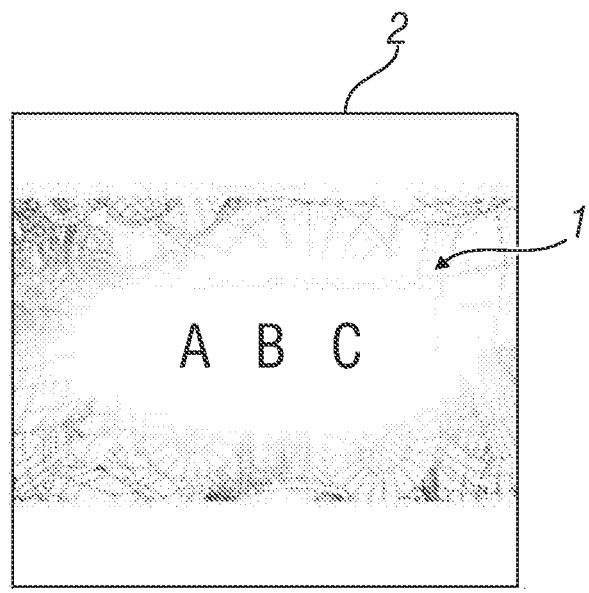
Figure 1B:
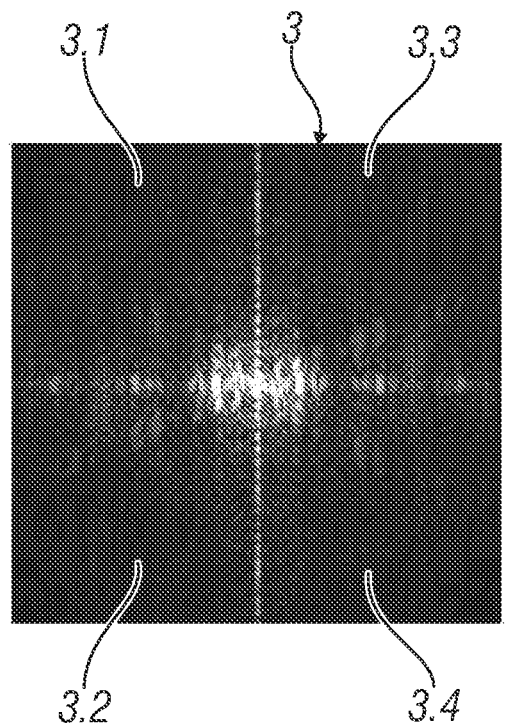

(51) Int. Cl.
    *G06F 17/18*     (2006.01)
    *G06K 7/14*     (2006.01)

(56) References Cited

U.S. PATENT DOCUMENTS

| | | | |
|---|---|---|---|
| 2007/0098234 A1* | 5/2007 | Fiala | G06K 9/3216 |
| | | | 382/120 |
| 2007/0172094 A1* | 7/2007 | Ho | G06T 1/005 |
| | | | 382/100 |
| 2010/0296712 A1* | 11/2010 | Chiang | G06T 7/0014 |
| | | | 382/131 |

* cited by examiner

AUGMENTED REALITY IMPLEMENTATION METHOD

TECHNICAL FIELD

The invention concerns a personalized reality implementation method, in particular via an electronic device such as a latest-generation mobile phone of the "smartphone" type.

BACKGROUND

In the last few years, there has been an increasingly widespread use of augmented reality. By this expression we mean a "reality" that can be perceived by the user with the aid of an electronic device. The latter may be constituted by glasses or visors that can be worn by the user, or else by an electronic processing device such as a computer, a tablet, or a smartphone.

The types of "realities" that can be perceived by the user may be very different and belong to a wide range of applications. For example, the user may display tourist information while visiting a place of interest, display information on housing units offered on sale or for rental while going along the streets of the area of interest, playing with games that associate augmented reality to the real environment, viewing a movie, or listening to an audio file associated, for example, to a page of a magazine, etc.

It is evident that augmented reality presents enormous potential and innumerable possibilities in terms of development. This technology is continuously and rapidly evolving.

Nowadays, augmented reality allows personalization of what is perceived by the user. In other words, the users that point the electronic device towards one and the same real object (for example, a street or a monument or a page of a magazine) associated to which is an augmented reality, will perceive different information.

SUMMARY

An aim of the present invention is to provide a personalized augmented reality flexible implementation method that is able to operate rapidly.

Another aim of the present invention is to provide a method that will be precise and reliable.

According to the present invention, a method is provided as defined in Claim 1 below.

According to the invention, a software that comprises a code for implementing the aforesaid method and a medium readable by an electronic device are moreover provided, as defined in Claims 11 and 12, respectively.

The invention may be better understood and implemented with reference to the attached drawings, which show an embodiment thereof provided by way of non-limiting example, wherein:

BRIEF DESCRIPTION OF THE DRAWING FIGURES

Figure 1C:
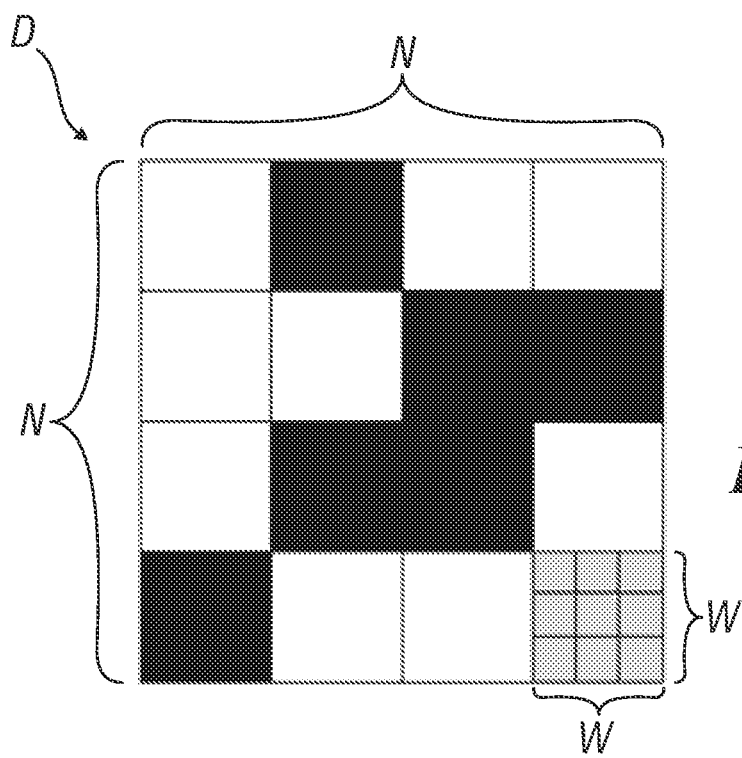
Figure 1D:
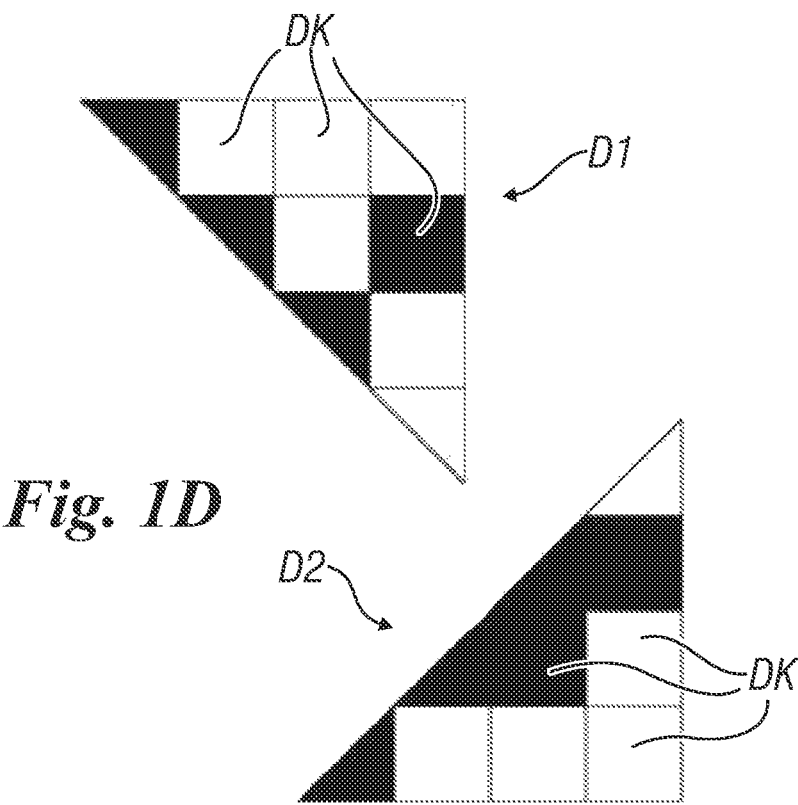
Figure 1E:
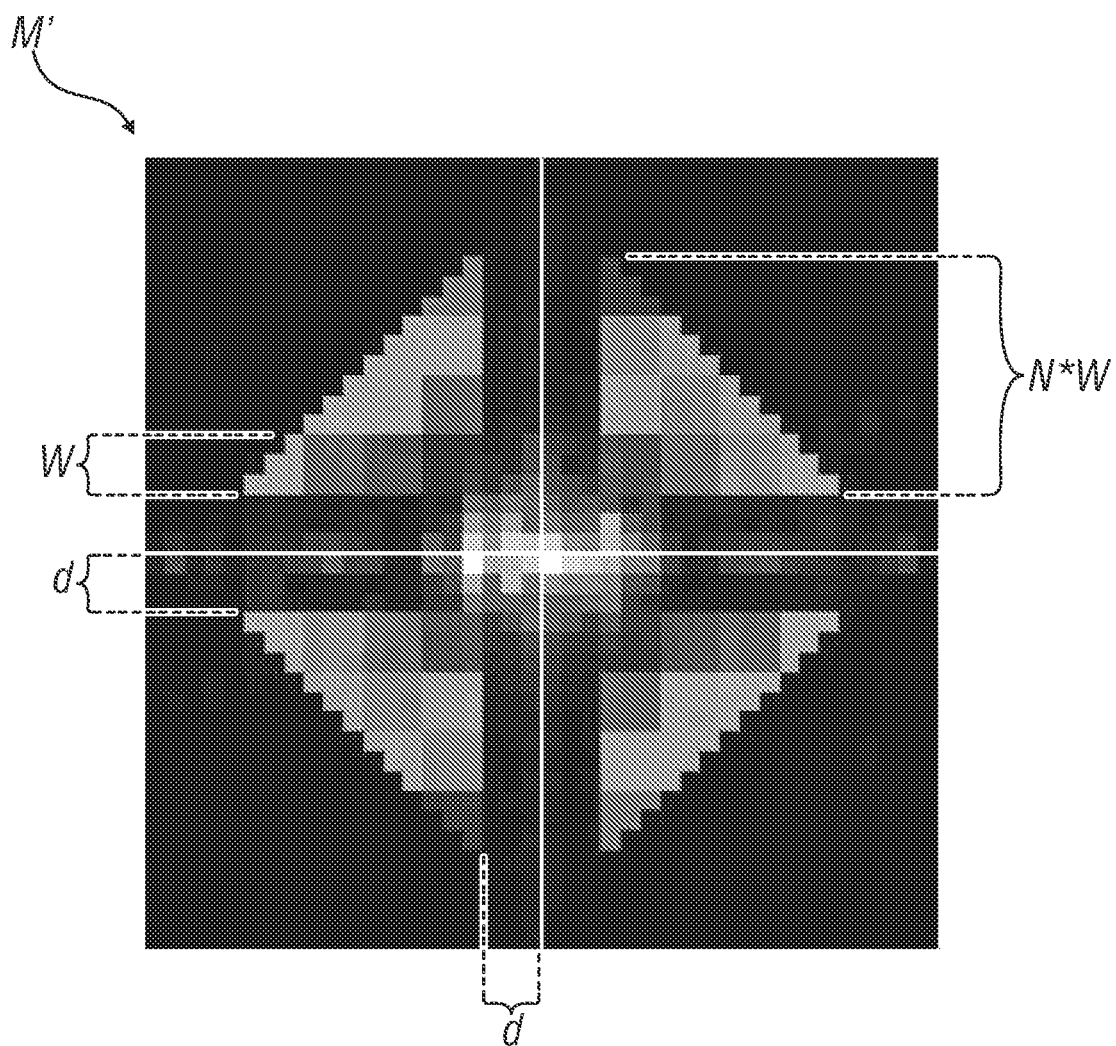
Figure 2:
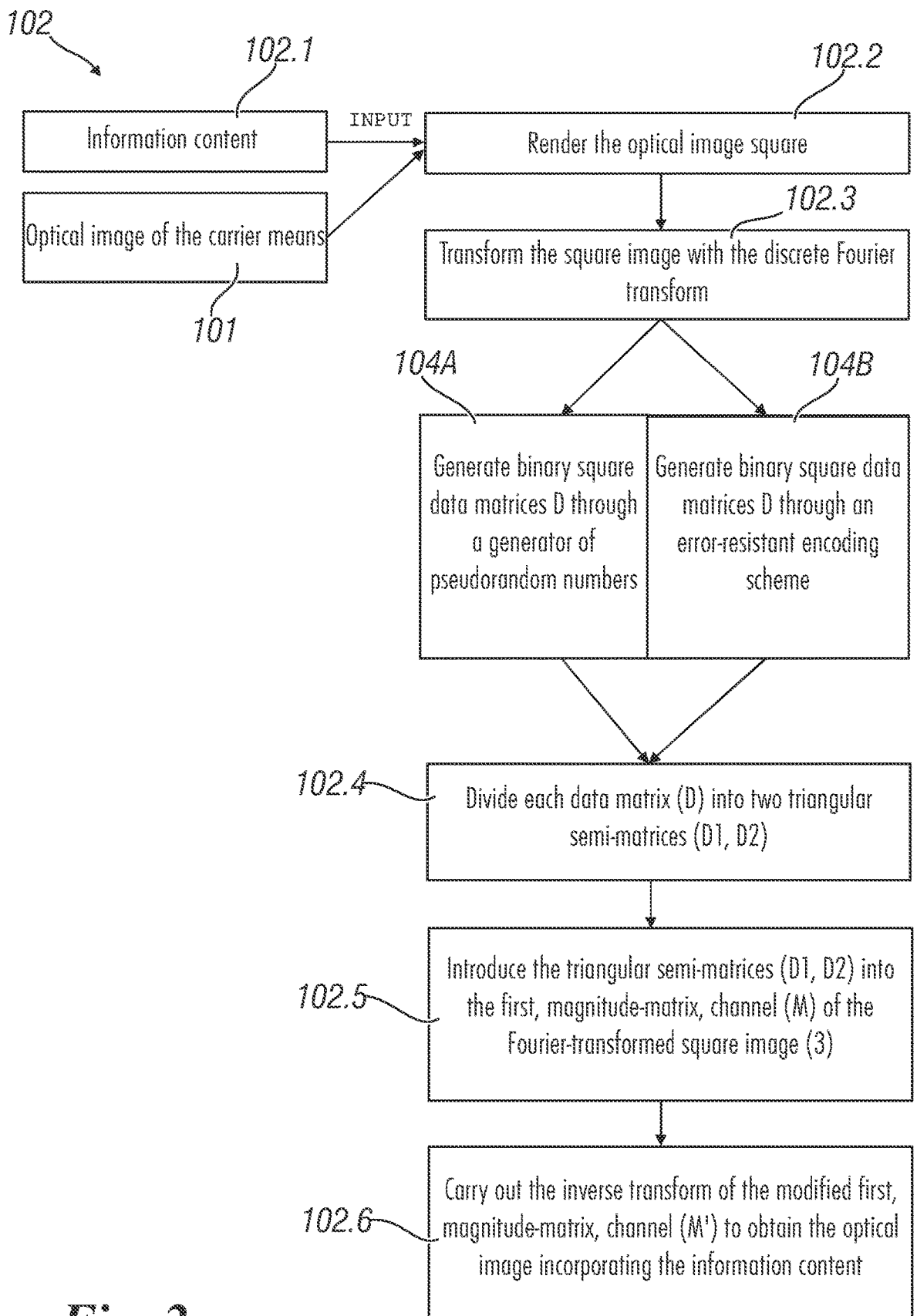
Figure 3:
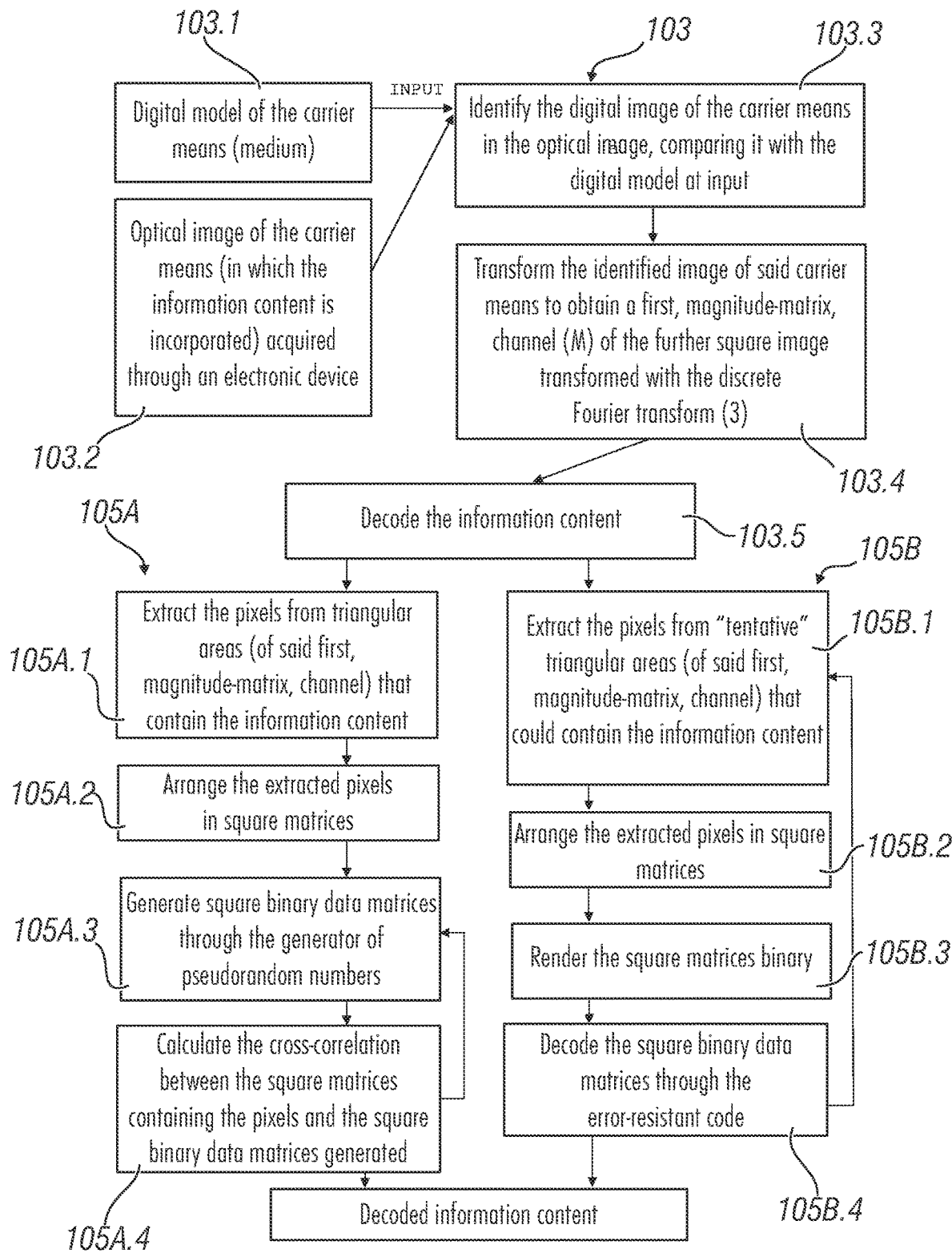

FIGS. 1*a*-1*e* show schematic images provided by way of example that illustrate the result of some steps of the method according to the invention; and FIGS. 2 and 3 are diagrams that illustrate a sequence of steps comprised in the method according to the invention.

DETAILED DESCRIPTION OF THE INVENTION

The steps of the method according to the invention for implementing a personalized augmented reality will be described in detail in what follows with particular reference to FIGS. 2 and 3.

Initially, the method envisages a first step 101 in which it is envisaged to receive at input an optical image of carrier means. The latter may comprise a physical medium, in particular in the form of paper or fabric, or else a digital medium, such as the display of an electronic device. FIG. 1*a* shows an example of an optical image, here designated by the reference number 1, of a carrier means, which in this case is a physical medium in paper form. Appearing in the example shown in the aforementioned figure is the optical image 1 of a card (physical medium) on which a pattern for carrying an advertisement by a firm is represented.

In other examples, not shown, the carrier means may be configured as a physical medium constituted by a fabric, for example a portion of a piece of clothing or an accessory that can be worn.

In yet other examples (not shown), the carrier means may be configured as a digital medium, such as a virtual environment constituted by the display of a tablet or by the monitor of a computer. In this case, the digital medium may be constituted by the desktop itself, or else by a file of any suitable format.

A second step 102 (FIG. 2), which will be described in greater detail in what follows, envisages incorporation of information content in the optical image 1 in such a way that the information content is hidden in the optical image. In other words, the optical image 1 will visually always appear the same, both before and after the information content has been incorporated therein.

The method envisages that the information content is personalizable, i.e., that it is different every time the method according to the invention is executed. In other words, if the method according to the invention is executed n times, it is possible to associate n different information contents to n optical images of the carrier means (physical or digital medium), which to the sight are all "apparently" the same as one another.

Since the information content is personalizable, it is to be noted that the augmented reality implementation method according to the invention is suited to being used also for applications in which the information content is protected by an access key, which is personal and exclusively associated to a given user. This is useful for all the applications in which it is desired to be certain that the step of reproducing the information content that enables the user to display the augmented reality does not infringe the intellectual property of third parties. By way of example, by associating a personal information content to each different user, it is possible to verify whether the user, before displaying the augmented reality, which may be reproduction of an audio file of a piece by a certain artist, has legally purchased the medium (for example, the cover of an album) or not, and enable display of the augmented reality only in the former case.

The information content comprises a sequence of data to which there may be associated a content chosen in a group constituted by: a 3D image of an object or a living being (for example, a person), a text, a video, a sound content, a numeric or alphanumeric code, etc. In general, the information content may be any multimedia content.

The information content may, for example, be constituted by a sequence of bytes.

In another version, the information content may be formed by a generic numeric sequence.

In a further version, the information content may be constituted by a sequence comprising numbers, letters, or symbols, either alone or in mutual combination.

It is evident that the longer the sequence of data, the more complex the information content incorporated within the optical images of the carrier means.

In order for the information content to be personalized, as has been said, it is different for each different optical image of the different carrier means. This means that the method according to the invention envisages, each time, incorporation of a different sequence of data (in particular of bytes) on each distinct carrier means.

A third step 103 (FIG. 3), which will be described in greater detail in what follows, envisages decoding of the information content that has been previously incorporated in the optical image.

The method then envisages a fourth step, in which it is envisaged to reproduce the information content on an electronic device. Said step of reproducing the information content enables the user to display the augmented reality that is inherent in the information content itself or else is triggered thereby.

The method further comprises, after the second step 102 (incorporation) and before the third step 103 (decoding), the step of transferring the optical image 1 onto the aforesaid carrier means.

The second step 102 comprises (the numeric references in brackets refer to FIG. 2):
receiving at input the information content (102.1);
if the optical image 1 is not square, rendering the optical image 1 (102.2) square so as to obtain a square image 2 (visible in FIG. 1*a*);
transforming the square image 2 with the discrete Fourier transform (102.3) to obtain a transformed square image 3 (FIG. 1*b*); the transformed square image 3 is formed by a first, magnitude-matrix, channel and by a second, phase-matrix, channel;
generating a plurality of data matrices (104A; 104B), in which each of these matrices is a binary square matrix; FIG. 1*c* shows an example of a binary square matrix, designated by the reference D;
dividing each data matrix (binary square matrix) into two triangular semi-matrices (102.4), denoted, respectively, by the references D1 and D2 in FIG. 1*d*;
introducing each of the triangular semi-matrices D1, D2 within the first, magnitude-matrix, channel of the transformed square image 3 (102.5) at a distance (d,d) from the constant Fourier coefficient to obtain a modified first, magnitude-matrix, channel designated by the letter M' and visible in FIG. 1*e*, wherein the step of introduction is calculated according to the following formula:

$$M'(x, y) = M(x, y) + D\left(\frac{x}{W}, \frac{y}{W}\right) * \alpha * \sum_{x',y' \in W} \frac{M(x+x', y+y')}{W}$$

for $0 < x < N*W, 0 < y < N*W$ applied to all the pixels of the modified first, magnitude-matrix, channel M' in the areas where the triangular semi-matrices are introduced, where:
M' is the modified first, magnitude-matrix, channel,
M is the first, magnitude-matrix, channel,
x and y are the co-ordinates that identify the points within the first, magnitude-matrix, channel M,
d is the distance from the constant Fourier coefficient and varies in a predefined way for each pair of triangular semi-matrices D1, D2, in such a way that each pair of semi-matrices does not overlap the other pairs of semi-matrices during the step of introduction into the modified first, magnitude-matrix, channel M'
D is the binary square matrix,
α is a predefined insertion coefficient,
N is the size of the binary square matrix D,
W is the size of each cell Dk of the binary square matrix D, measured in pixels on said modified first, magnitude-matrix, channel M', and
x', y', are the co-ordinates that identify the points within a window of pixels of size W×W centred in the point (x,y) of the first, magnitude-matrix, channel M.

The second step 102 further comprises, after the step of introduction (of the triangular semi-matrices D1, D2 into the first, magnitude-matrix, channel of the transformed square image 3), the step of carrying out the inverse transform of the modified first, magnitude-matrix, channel M' (102.6) together with the second, phase-matrix, channel (of the transformed square image 3) to obtain the optical image in which the information content has been incorporated.

Amongst the steps comprised in the second step 102, the step of generating a plurality of data matrices D (square binary matrices) can be executed according to a first variant, designated by 104A in FIG. 2, or else according to a second variant, designated by 104B, once again in FIG. 2.

The first variant 104A envisages the steps of:
dividing the information content into pairs of 8 bytes, where each pair is used as seed for a generator of pseudorandom numbers; and
generating square binary data matrices through the generator of pseudorandom numbers.

The second variant 104B envisages, instead, the steps of:
encoding the information content with an error-resistant encoding scheme, such as the Golay code, to obtain one or more binary vectors; and
generating square binary data matrices by ordering into matrices the aforesaid one or more binary vectors.

Amongst the steps comprised in the second step 102, the step of introducing each of the triangular semi-matrices D1, D2 into the first, magnitude-matrix, channel of the transformed square image 3 comprises:
introducing a first triangular semi-matrix D1, D2 into the upper quadrant of the left-hand quadrant 3.1 of the first, magnitude-matrix, channel of the transformed square image 3;
introducing a second triangular semi-matrix D2, D1 into the lower quadrant of the left-hand quadrant 3.2 of the first, magnitude-matrix, channel of the transformed square image 3;
introducing the second triangular semi-matrix D2, D1 into the upper quadrant of the right-hand quadrant 3.3 of the first, magnitude-matrix, channel of the transformed square image 3; and
introducing the first triangular semi-matrix D1, D2 into the lower quadrant of the right-hand quadrant 3.4 of said first, magnitude-matrix, channel of the transformed square image 3.

Once the second step 102 is completed, the method according to the invention envisages transferring the optical image in which the information content has been incorporated onto suitable carrier means, as described previously.

Next, the method envisages carrying out the third step 103, which comprises the following steps (the numeric references in brackets refer to FIG. 3):

- receiving at input a digital model of the carrier means (103.1);
- acquiring an optical image 1 of the carrier means (medium) by means of an electronic device suitable for capturing images (103.2), such as a smartphone or a tablet or a computer provided with digital camera;
- identifying a digital image of the carrier means in the optical image on the basis of the digital model of the carrier means received as input (103.3);
- comparing the digital image of the carrier means identified in the optical image with the digital model of the carrier means (103.3);
- if the outcome of the comparison is positive, tracking for some frames the identified image of the carrier means, where the tracking operation is performed according to known techniques, such as those described by Wagner et al. (D. Wagner, T. Langlotz, and D. Schmalstieg, "Robust and unobtrusive marker tracking on mobile phones", Mixed and Augmented Reality, 2008. ISMAR 2008. 7th IEEE/ACM International Symposium on, Cambridge, 2008, pp. 121-124. DOI: 10.1109/IS-MAR.2008.4637337) or else by Rekimoto et al. (J. Rekimoto, "Matrix: a realtime object identification and registration method for augmented reality", Computer Human Interaction, 1998. Proceedings. 3rd Asia Pacific, Shonan Village Center, 1998, pp. 63-68. DOI: 10.1109/APCHI.1998.704151);
- continuing to compare the identified image of the carrier means with the digital model of the carrier means during the aforesaid tracking step (103.3);
- if the outcome of the comparison (throughout the time interval during which it is envisaged to continue comparing) is positive, calculating a homography between the identified image of the carrier means and the digital model of the carrier means, where the homography may be calculated according to known techniques, such as those described by Zhou et al. (C. Zhou, D. L. Tan, F. Zhu, and Z. L. Dong, "A planar homography estimation method based on multi-view total least squares", Robotics, Intelligent Systems and Signal Processing, 2003. Proceedings. 2003 IEEE International Conference on, 2003, pp. 1261-1266, vol. 2. DOI: 10.1109/RISSP.2003.1285773) or else by Agarwal et al. (A. Agarwal, C. V. Jawahar, and P. J. Narayanan, "A Survey of Planar Homography Estimation Techniques", IIIT Technical Report IIIT/TR/2005/12, June 2005);
- defining a normalized system of co-ordinates as a function of the homography;
- transforming via the homography calculated the identified image of the carrier means, pixel by pixel, as a function of the normalized system of co-ordinates so as to obtain a transformed image (103.4); in other words, a "remapping" is carried out of the identified image of the carrier means from one space to another, where this operation enables elimination of any distortion in the image due to perspective in such a way that the identified image of the carrier means is viewed front-on;
- if the transformed image is not square, rendering the transformed to image square so as to obtain a square transformed image (103.4), where, in order to render the transformed image square, black spaces are added in appropriate positions until the transformed image is square;
- further transforming the square transformed image with the discrete Fourier transform to obtain a further transformed square image (103.4), where the further transformed square image is formed by a first, magnitude-matrix, channel and by a second, phase-matrix, channel; and
- implementing a procedure that enables decoding of the information content (103.5) starting from the further transformed square image.

Amongst the steps comprised in the third step 103, the step of implementing a procedure that will enable decoding of the information content can be carried out according to a first variant, designated by 105A in FIG. 3, or else according to a second variant, designated by 105B, once again in FIG. 3. It should be noted that it will be necessary to resort to the first variant 105A if, within the second step 102, the step of generating a plurality of data matrices D (square binary matrices) has been carried out according to the first variant 104A.

Likewise, it will be necessary to resort to the second variant 105B if, within the second step 102, the step of generating a plurality of data matrices D (square binary matrices) has been, instead, carried out according to the second variant 104B.

In the case of the first variant 105A of the third step 103, it is necessary to receive at input a copy of the information content that has been previously incorporated in the optical image 1. Said copy may be stored in a remote server or else within the electronic device (in particular within the application installed therein) through which the third step 103 of decoding the information content is carried out.

The first variant 105A of the third step 103 envisages the steps of:

- seeking, in the further transformed square image, triangular areas in which the information content is present, where the triangular areas correspond in number, position, and size to the triangular semi-matrices D1 and D2 introduced in the second step 102;
- extracting the pixels from the triangular areas of the first, magnitude-matrix, channel of the further transformed square image (105A.1);
- arranging the extracted pixels within a predefined number of further square matrices (105A.2);
- resizing the further square matrices (containing the extracted pixels) so as to obtain a certain number of resized square matrices, each having the same size as the binary square matrices D generated during the second step 102;
- dividing the copy of the information content into pairs of 8 bytes, in which each of said pairs is used as seed for a generator of pseudorandom numbers;
- generating square binary data matrices through the generator of pseudorandom numbers (105A.3);
- calculating a statistical correlation between the resized square matrices and the square binary data matrices D (105A.4) as arithmetic mean of the result of the following formula applied to each pair formed by the resized square matrix and the corresponding binary data matrix:

$$r = \frac{\sum_i (X(i) - X') * (Y(i) - Y')}{\sqrt{\sum_i (X(i) - X')^2} * \sqrt{\sum_i (Y(i) - Y')^2}}$$

where:
i is an index that refers to the i-th element of the matrix,
X (or Y) is a square binary data matrix generated through the generator of pseudorandom numbers,
Y (or X) is a resized square matrix,
X' (or Y') is the arithmetic mean of the content of the square binary data matrix,
Y' (or X') is the arithmetic mean of the content of the resized square matrix;
comparing the result obtained from the operation of calculating the statistical correlation (through the methodology given above) with a predefined threshold value, wherein, if the result obtained from the calculation is greater than the threshold value, then it may be concluded that the step of decoding of the information content has had a positive outcome; otherwise, it is necessary to return to step 105A.3 and generate again further square binary data matrices.

The second variant 1056 of the third step 103 envisages the steps of:
seeking, in the further transformed square image, triangular areas (the so-called "tentative areas") in which the information content is present, where the triangular areas correspond (in number and size but not in position) to the triangular semi-matrices D1 and D2, using as initial position the aforesaid distance (d,d) used in the second step 102;
extracting the pixels from the triangular areas selected (in the previous point) of the first, magnitude-matrix, channel of the further transformed square image (1056.1);
arranging the extracted pixels within a predefined number of further square matrices (1056.2);
resizing the further square matrices (containing the extracted pixels) so as to obtain a certain number of resized square matrices, each having the same size as the binary square matrices D generated during the second step 102;
rendering binary the resized square matrices (1056.3), where in this step it is envisaged to compare the values contained within the resized square matrices with a pre-determined limit value calculated on the basis of the distance (d,d) from the Fourier constant value, and, on the basis of the outcome of the comparison, each value contained in the resized square matrices is transformed into 0 (or else 1) if the value is greater than the limit value and is, instead, transformed into 1 (or else 0) if the value is lower than the limit value;
decoding these binary data matrices (generated as explained in the previous point) using the same error-resistant encoding scheme (1056.4), such as the Golay code, as the one used in the second step 102; and
repeating all the steps listed previously of the second variant 1056 if the outcome of the decoding step does not yield a positive outcome, where said repetition envisages seeking, in the further transformed square image, further triangular areas in a further position (d',d') different from the previous one.

Thanks to the invention a method for implementing augmented reality is provided, which is characterized by several advantages.

An advantage of the method according to the invention is that it enables incorporation on suitable carrier means (physical medium or else digital medium) of a different information content in each different optical image 1 of the respective carrier means in such a way that reproduction of the information content can offer to the user the possibility of displaying a personal augmented reality, different from that of all the other users that possess carrier means that are apparently identical to the sight but within which a different information content (i.e., sequence of data, or bytes) has been incorporated.

Another advantage of the method according to the invention is that it provides two different operative variants, both in the second step 102 (incorporation of the information content in the carrier means) and in the third step 103 (decoding of said information content), each with its own advantageous peculiarities.

The first variant 104A, 105A presents the advantage of enabling the third step 103 to be carried out in a fast and simple manner. In this case, the information content that can be incorporated in the optical image 1—i.e., the sequence of data—cannot be excessively complex.

The second variant 104B, 105B presents the advantage of enabling, during the second step 102, incorporation in the optical image 1 of a considerably high amount of data and of not requiring a copy of the information content at input. In the case of this variant, the third step 103 (decoding) is carried out at a lower speed, and the result of the decoding presents a slightly lower rate of success.

The invention claimed is:
1. A method for implementing a personalized augmented reality associated to carrier means, wherein said method comprises:
receiving at input an optical image (1) of said carrier means;
incorporating an information content in said optical image (1) in such a way that said information content is hidden in said optical image (1), where said information content is customizable (102);
decoding said information content (103); and
reproducing said information content through an electronic device, wherein said reproduction enables implementation of said augmented reality;
said method envisaging, after said incorporation and prior to said decoding, the step of transferring said optical image (1) onto said carrier means, wherein the latter may comprise a physical medium, in particular in the form of paper or fabric, or else a digital medium, such as a display of an electronic device,
said method being characterized in that said incorporation of the information content in said optical image (1) comprises:
receiving at input said information content (102.1);
if said optical image (1) is not square, rendering said optical image square (102.2) so as to obtain a square image (2);
transforming said square image (2) with the discrete Fourier transform (102.3) to obtain a transformed square image (3), wherein said transformed square image (3) is formed by a first, magnitude-matrix, channel and by a second, phase-matrix, channel;
generating a plurality of data matrices (D), wherein each of said matrices is a binary square matrix (104A, 104B);
dividing each of said data matrices (D) into two triangular semi-matrices (D1, D2) (102.4);

introducing each of said triangular semi-matrices (D1, D2) within said first, magnitude-matrix, channel of said transformed square image (3) (102.5) at a distance (d, d) from the constant Fourier coefficient to obtain a modified first, magnitude-matrix, channel (M'), said distance (d, d) varying in a predefined way for each pair of triangular semi-matrices (D1, D2), in such a way that each pair of semi-matrices does not overlap with the other pairs of semi-matrices during the step of introduction into said modified first, magnitude-matrix, channel M'; and after said introduction, carrying out the inverse transform of said modified first, magnitude-matrix, channel (M') together with said second, phase-matrix, channel to obtain said optical image in which said information content has been incorporated.

2. The method according to claim 1, wherein said introduction is calculated according to the following formula:

$$M'(x, y) = M(x, y) + D\left(\frac{x}{W}, \frac{y}{W}\right) * \alpha * \sum_{x', y' \in W} \frac{M(x+x', y+y')}{W}$$

for $0 < x < N*W, 0 < y < N*W$ repeated for all the pixels of said modified first, magnitude-matrix, channel (M') in which said triangular semi-matrices (D1, D2) are introduced, where:

M' is the modified first, magnitude-matrix, channel,
M is the first, magnitude-matrix, channel,
x and y are the co-ordinates that identify the points within the first, magnitude-matrix, channel M,
d is the distance from the constant Fourier coefficient,
D is the binary square matrix,
a is a predefined insertion coefficient,
N is the size of the binary square matrix,
W is the size of each cell (Dk), i.e., D(x/W, y/W) of the binary square matrix D, measured in pixels on said modified first, magnitude-matrix, channel M', and
x', y' are the co-ordinates that identify the points within a window of pixels of size W×W centred in the point (x, y) of the first, magnitude-matrix, channel M.

3. The method according to claim 2, wherein said generation of said plurality of data matrices (D) comprises:

dividing said information content into pairs of 8 bytes, where each of said pairs is used as seed for a generator of pseudorandom numbers; and generating square binary data matrices through said generator of pseudorandom numbers (104A).

4. The method according to claim 2, wherein said generation of said plurality of data matrices (D) comprises:

encoding the information content with an error-resistant encoding scheme, such as the Golay code, to obtain one or more binary vectors; and generating square binary data matrices by ordering into matrices said one or more binary vectors (104B).

5. The method according to claim 2, wherein said introduction of each of said triangular semi-matrices (D1, D2) into said first, magnitude-matrix, channel (M) of said transformed square image (3) comprises:

introducing a first triangular semi-matrix (D1) into the upper quadrant of the left-hand quadrant (3.1) of said first, magnitude-matrix, channel (M) of said transformed square image (3);

introducing a second triangular semi-matrix (D2) into the lower quadrant of the left-hand quadrant (3.2) of said first, magnitude-matrix, channel (M);

introducing said second triangular semi-matrix (D2) into the upper quadrant of the right-hand quadrant (3.3) of said first, magnitude-matrix, channel (M); and introducing said first triangular semi-matrix (D1) into the lower quadrant of the right-hand quadrant (3.4) of said first, magnitude-matrix, channel (M).

6. The method according to claim 2, wherein said decoding of said information content comprises:

receiving at input a digital model of said carrier means (103.1);

acquiring an optical image of said carrier means by means of an electronic device suitable for capturing images (103.2);

identifying a digital image of said carrier means in said optical image on the basis of said digital model of said carrier means received as input (103.3);

comparing said identified digital image of said carrier means in said optical image with said digital model of said carrier means (103.3);

if the outcome of said comparison is positive, tracking for some frames said identified digital image of said carrier means;

continuing to compare said identified image of said carrier means with said digital model of said carrier means during said tracking operation (103.3);

if the outcome of said step of continuing to compare is positive, calculating a homography between said identified image of said carrier means and said digital model of said carrier means;

defining a system of co-ordinates as a function of said homography;

transforming said identified image of said carrier means, pixel by pixel, as a function of said system of co-ordinates via said homography so as to obtain a transformed image (103.4);

if said transformed image is not square, rendering said transformed image square so as to obtain a square transformed image (103.4);

further transforming said square transformed image with the discrete Fourier transform to obtain a further transformed square image, wherein said further transformed square image is formed by a first, magnitude-matrix, channel and by a second, phase-matrix, channel (103.4); and implementing a procedure that enables decoding of said information content starting from said further transformed square image (103.5).

7. The method according to claim 6, wherein said implementation of said procedure comprises:

receiving at input a copy of said information content that has been previously incorporated in said optical image;

seeking, in said further transformed square image, triangular areas in which said information content is present, where said triangular areas correspond in number, position, and size to the triangular semi-matrices (D1, D2) introduced as per claim 2;

extracting the pixels from said triangular areas of said first, magnitude-matrix, channel of said further transformed square image (105A.1);

arranging said extracted pixels within a predefined number of further square matrices (105A.2);

resizing said further square matrices so as to obtain a certain number of resized square matrices each having the same size as said binary square matrices (D) generated during said incorporation;

dividing said copy of said information content into pairs of 8 bytes, where each of said pairs is used as seed for a generator of pseudorandom numbers;

generating square binary data matrices through said generator of pseudorandom numbers (105A.3);

calculating a statistical correlation between said resized square matrices and said square binary data matrices (105A.4) as arithmetic mean of the result of the following formula applied to each pair constituted by the resized square matrix and the corresponding binary data matrix:

$$r = \frac{\sum_i (X(i) - X') * (Y(i) - Y')}{\sqrt{\sum_i (X(i) - X')^2} * \sqrt{\sum_i (Y(i) - Y')^2}}$$

where:

i is an index that refers to the i-th element of the matrix,

X (or Y) is one of said square binary data matrices generated through said generator of pseudorandom numbers, Y (or X) is one of said resized square matrices, X' is the arithmetic mean of the content of said square binary data matrices, and Y' is the arithmetic mean of the content of said resized square matrix; and comparing the result obtained from said calculation of said statistical correlation with a predefined threshold value, where, if the result of said calculation is greater than said threshold value, then said decoding of said information content has yielded a positive outcome; otherwise, it is envisaged to repeat said generation of square binary data matrices (105A.3) to generate further square binary data matrices and then repeat said calculation of said statistical cross-correlation (105A.4).

8. The method according to claim 6, wherein said implementation of said procedure comprises:

seeking, in said further transformed square image, triangular areas in which said information content is present, where said triangular areas correspond, in number and size but not in position, to said triangular semi-matrices (D1, D2), using as initial position said distance (d, d) from the constant Fourier coefficient;

extracting the pixels from said triangular areas of said first, magnitude-matrix, channel of said further transformed square image (105B.1);

arranging said extracted pixels within a predefined number of further square matrices (105B.2);

resizing said further square matrices so as to obtain a certain number of resized square matrices, each having the same size as said binary square matrices (D) generated during said incorporation;

rendering said resized square matrices binary (105B.3);

decoding said binary data matrices (105B.4) using the same error-resistant encoding scheme as the one used during said incorporation of said information content in said optical image (1); and repeating said procedure in a recursive way if said decoding does not yield a positive outcome, where said repetition envisages seeking, in said further transformed square image, further triangular areas in which said information content is present that differ from said triangular areas identified previously.

9. The method according to claim 1, wherein said information content comprises a sequence of data to which there can be associated a content chosen in a group constituted by: a 3D image of an object or a person, a text, a video, a sound content, any multimedia content, a numeric sequence, an alphanumeric sequence, or a sequence of bytes, etc.

10. The method according to claim 1, wherein said electronic device may be chosen in a group constituted by: a mobile phone of the smartphone type, a tablet, a computer, a wearable visor, etc.

11. A software, which comprises a code for executing the method according to claim 1, when the software is run on a suitable electronic device.

12. A medium that can be read by an electronic device supporting a software as defined in claim 11.

* * * * *

UNITED STATES PATENT AND TRADEMARK OFFICE
CERTIFICATE OF CORRECTION

PATENT NO. : 10,706,126 B2
APPLICATION NO. : 16/325826
DATED : July 7, 2020
INVENTOR(S) : Davide Baltieri, Lorenzo Canali and Giovanni Zuffolini Page 1 of 1

It is certified that error appears in the above-identified patent and that said Letters Patent is hereby corrected as shown below:

In the Claims

Claim 2, Column 9, Line 37: please replace "a is a predefined insertion coefficient," with --- α is a predefined insertion coefficient, ---

Claim 7, Column 11, Lines 16-18: please replace "$r = \dfrac{\sum_i (X(i)-X')*(Y(i)-Y')}{\sqrt{\sum_i (X(i)-X')^2} * \sqrt{\sum_i (Y(i)-Y')^2}}$" with "$r = \dfrac{\sum_i (X(i)-X')*(Y(i)-Y')}{\sqrt{\sum_i (X(i)-X')^2} * \sqrt{\sum_i (Y(i)-Y')^2}}$" ---

Signed and Sealed this
Fifteenth Day of September, 2020

Andrei Iancu
*Director of the United States Patent and Trademark Office*